No. 884,004. PATENTED APR. 7, 1908.
W. H. BENNETT.
WORK CLAMP.
APPLICATION FILED AUG. 9, 1907.
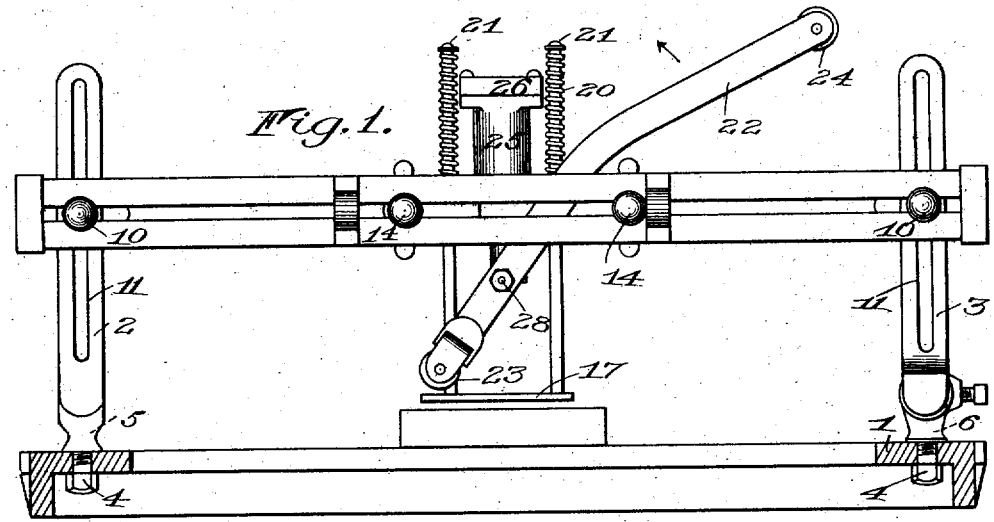
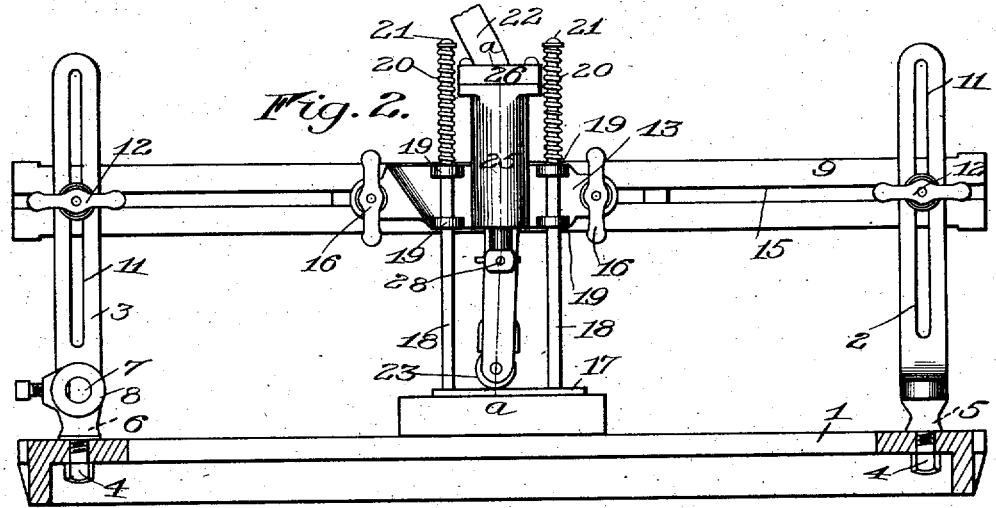
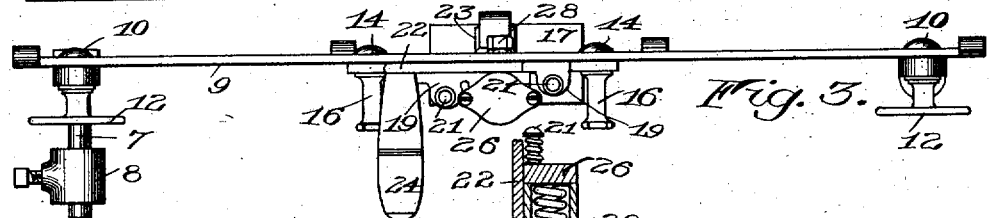
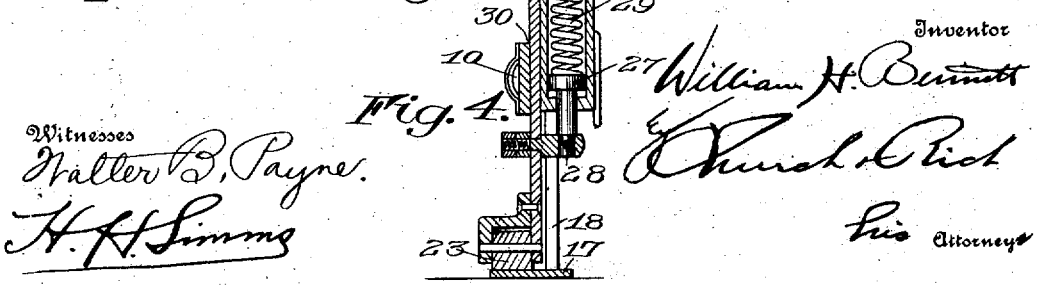
Witnesses
Walter B. Payne.
H. H. Simms
Inventor
William H. Bennett
Church & Rich
his Attorneys
THE NORRIS PETERS CO., WASHINGTON, D. C.

UNITED STATES PATENT OFFICE.

WILLIAM H. BENNETT, OF ROCHESTER, NEW YORK, ASSIGNOR TO SIMEON WILE, OF ROCHESTER, NEW YORK.

WORK-CLAMP.

No. 884,004.

Specification of Letters Patent.

Patented April 7, 1908.

Application filed August 9, 1907. Serial No. 387,779.

*To all whom it may concern:*

Be it known that I, WILLIAM H. BENNETT, of Rochester, in the county of Monroe and State of New York, have invented certain new and useful Improvements in Work-Clamps; and I do hereby declare the following to be a full, clear, and exact description of the same, reference being had to the accompanying drawings, forming a part of the specification, and to the reference-numerals marked thereon.

My present invention relates to work clamps for tenoning machines and particularly to that type of clamps in which there is employed a pair of vertical guides or uprights connected by a horizontal guide which is vertically adjustable thereon and has a horizontally adjustable clamp-carrier supporting a clamp operated by a pivoted lever;
an object of this invention being to provide a yielding support or mounting on the carrier for the clamp operating lever to permit the clamp to accommodate itself to work in different thicknesses.

To these and other ends the invention consists in certain improvements and combinations of parts all as will be hereinafter more fully described, the novel features being pointed out in the claims at the end of the specification.

In the drawings: Figure 1 is a view of one side of the clamp constructed in accordance with my invention. Fig. 2 is a view of the opposite side of the same clamp. Fig. 3 is a top view, and Fig. 4 is a cross section on the line *a—a* of Fig. 2.

Similar reference numerals in the several figures indicate similar parts.

In the embodiment of my invention herein shown 1 indicates a support in the form of a traveling carriage of a tenoning machine, such for instance, as shown in my Patent No. 474,515, dated May 10, 1892. Supported on this carriage are two vertical guides or standards 2 and 3 which are preferably secured to the carriage by bolts 4 passing through openings in the table and entering threaded sockets 5 and 6 respectively in the lower ends of the guides, one of the said guides being shiftable relatively to the support or carriage 1 as by a horizontal arm 7 working through the socket piece 8, for the purpose of permitting the clamp to grip the material nearer or farther from the path of the knives of the machine.

Vertically adjustable on these guides or standards 2 and 3 is a horizontal guide 9, which for the purpose of this adjustment in this instance carries bolts 10 passing through vertical slots 11 in the guides and engaged on the opposite sides of the latter by manually operable clamp nuts 12.

A clamp carrier 13 is horizontally adjustable on the horizontal guide and for this purpose carries headed bolts 14 which work in a longitudinal slot 15 on the guide and serve with manually operated nuts 16 to clamp the carrier against one face of the guide. The carrier supports a clamp preferably in the form of a horizontal plate 17 suspended therefrom as by means of a pair of parallel rods 18, each passing through one of two pairs of horizontal lugs 19 on the carrier and held in an elevated position by a coil spring 20 which surrounds the rod 18 and bears at its lower end against the upper horizontal lug and at its upper end against a head 21 on the rod.

In order to depress the clamp there is provided a bent lever 22 which carries at its lower end a roller 23 to travel on the upper surface of the clamp and at its upper end a handle piece 24 by which it is operated. This lever is pivotally and yieldingly supported on the clamp carrier which for this purpose is preferably provided with an integral tubular housing 25, closed at its top by a removable cap plate 26 and having a support or headed plunger 27 movable vertically therein and carrying at its lower end a pivot 28 for the lever, the plunger being held in a depressed position by a spring 29 arranged within the housing between the removable cap plate and the upper or headed end of the plunger. Above the pivot 28 the lever works in a depression 30 provided in the proximate face of the guide, the wall of the depression serving to brace the lever against lateral movement.

In operation the clamp 17 is adjusted by raising or by lowering the horizontal guide on the standards 2 and 3 to accommodate the clamp to the thickness of the material being worked upon and the clamp carrier is shifted horizontally to position the clamp over the work. On the movement of the operating lever in the direction of the arrow on Fig. 1, its lower end will roll upon the clamp and depress the latter, and should the material be slightly thicker than that for which the clamp is adjusted, as is a common occurrence, the support of the operating lever will shift and prevent the material being injured.

It will be noted that I have provided a simple and effective clamp in which all danger from breaking is eliminated by removing excessive strains from the horizontal guide.

I claim as my invention:

1. The combination with a pair of vertical guides, a horizontal guide vertically adjustable on the vertical guides, a clamp carrier horizontally adjustable on the horizontal guide, and a clamp movable thereon, of a lever-support yieldingly mounted on the carrier, and a lever pivoted on the support.

2. In a tenoning machine clamp, the combination with a suitable support, a pair of standards, means for securing the latter to the support, a horizontal guide vertically adjustable on the standards, a clamp carrier adjustable on the guide and a clamp movable on the carrier, of a spring casing on the carrier, a plunger movable in the casing, a spring in the casing acting to depress the plunger, and a lever for operating the clamp, pivoted on the plunger.

3. In a tenoning machine clamp, the combination with a pair of standards, and a horizontal guide vertically adjustable on the standards, of a clamp carrier adjustable on one face of the guide and having its proximate face provided with a depression, a clamp movable on the carrier, a spring pressed lever support movable on the carrier, and an operating lever for the clamp, movable in the depression in the carrier and pivotally connected to the spring pressed support.

4. In a tenoning machine clamp, the combination with a pair of standards, a horizontal guide vertically adjustable on the standards, a clamp carrier adjustable on the guide and a clamp movable on the carrier, of a yieldingly mounted lever support on the carrier, and an operating lever for the clamp pivotally connected to the support.

5. In a tenoning machine clamp, the combination with a suitable support, a pair of standards, means for securing the latter to the support, and a horizontal guide movable on the standards, of a clamp carrier adjustable on one face of the horizontal guide and having its proximate face provided with a depression, a clamp movable on the carrier, a tubular casing on the support having a removable cap plate, a headed plunger movable in the casing, a spring arranged between the plunger and the cap plate, and an operating lever pivoted to the plunger and carrying a roller engaging the clamp.

WILLIAM H. BENNETT.

Witnesses:
 RUSSELL B. GRIFFITH,
 H. H. SIMMS.